(12) United States Patent
Wu et al.

(10) Patent No.: US 11,460,355 B2
(45) Date of Patent: Oct. 4, 2022

(54) ANTENNA DEVICE AND TEMPERATURE DETECTION METHOD

(71) Applicant: Tokyo Electron Limited, Tokyo (JP)

(72) Inventors: Tong Wu, Miyagi (JP); Tomohide Minami, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 289 days.

(21) Appl. No.: 16/903,123

(22) Filed: Jun. 16, 2020

(65) Prior Publication Data
US 2020/0408612 A1 Dec. 31, 2020

(30) Foreign Application Priority Data
Jun. 27, 2019 (JP) .............................. JP2019-119616

(51) Int. Cl.
*H01Q 1/38* (2006.01)
*G01K 11/26* (2006.01)

(52) U.S. Cl.
CPC .............. *G01K 11/265* (2013.01); *H01Q 1/38* (2013.01)

(58) Field of Classification Search
CPC .......... G01K 11/265; H01Q 1/36; H01Q 1/38; H01Q 1/40; H01Q 9/0407; H01Q 9/06; H01Q 9/065; H01Q 9/28
See application file for complete search history.

(56) References Cited

U.S. PATENT DOCUMENTS 6,329,655 B1* 12/2001 Jack .......................... G01J 5/20
338/14

FOREIGN PATENT DOCUMENTS

JP 2016-146558 A 8/2016

* cited by examiner

*Primary Examiner* — Jimmy T Vu
(74) *Attorney, Agent, or Firm* — Studebaker & Brackett PC

(57) ABSTRACT

An antenna device according to an exemplary embodiment includes a first metal layer, a first dielectric layer, a second metal layer, and a second dielectric layer. The first dielectric layer has a thermal conductivity and heat resistance that are higher than those of an FR-4 resin. The antenna device includes a first metal terminal and a second metal terminal, and a thermosensor. A pair of an input terminal and an output terminal of the thermosensor are electrically connected to the first metal terminal and the second metal terminal, respectively, and the second metal layer includes a first segment and a second segment. The first metal terminal is disposed above the first segment, and the second metal terminal is disposed above the second segment.

12 Claims, 7 Drawing Sheets

ANTENNA DEVICE AND TEMPERATURE DETECTION METHOD

CROSS-REFERENCE TO RELATED APPLICATIONS

This application is based on and claims the benefit of priority from Japanese Patent Application No. 2019-119616 filed on Jun. 27, 2019 with the Japan Patent Office, the entire contents of which are incorporated herein by reference.

TECHNICAL FIELD

Exemplary embodiments of the present disclosure relate to an antenna device and a temperature detection method.

BACKGROUND

Various compact antennas (tag antennas) have been developed. A technique relating to such an antenna is disclosed in, for example, Japanese Unexamined Patent Publication No. 2016-146558. This antenna includes a dielectric, a metal layer, a radiating element layer, and a non-contact power supply element. The metal layer is provided on one surface of the dielectric layer. The radiating element layer is provided on the other surface of the dielectric layer. The radiating element layer has a slit portion. The slit portion is provided at the center of the radiating element layer. The non-contact power supply element is provided above the slit portion.

SUMMARY

In one exemplary embodiment, an antenna device is provided. The antenna device includes: a first metal layer; a first dielectric layer disposed on the first metal layer, the first dielectric layer having a thermal conductivity and heat resistance that are higher than those of an FR-4 resin; a second metal layer disposed on the first dielectric layer, the second metal layer including a first segment and a second segment separated from each other; a second dielectric layer disposed on the second metal layer; a first metal terminal and a second metal terminal separately disposed on the second dielectric layer, the first metal terminal and the second metal terminal being disposed above the first segment and the second segment, respectively; and a thermosensor disposed on the second dielectric layer, the thermosensor having a pair of an input terminal and an output terminal electrically connected to the first metal terminal and the second metal terminal, respectively.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

DETAILED DESCRIPTION

Figure 1:
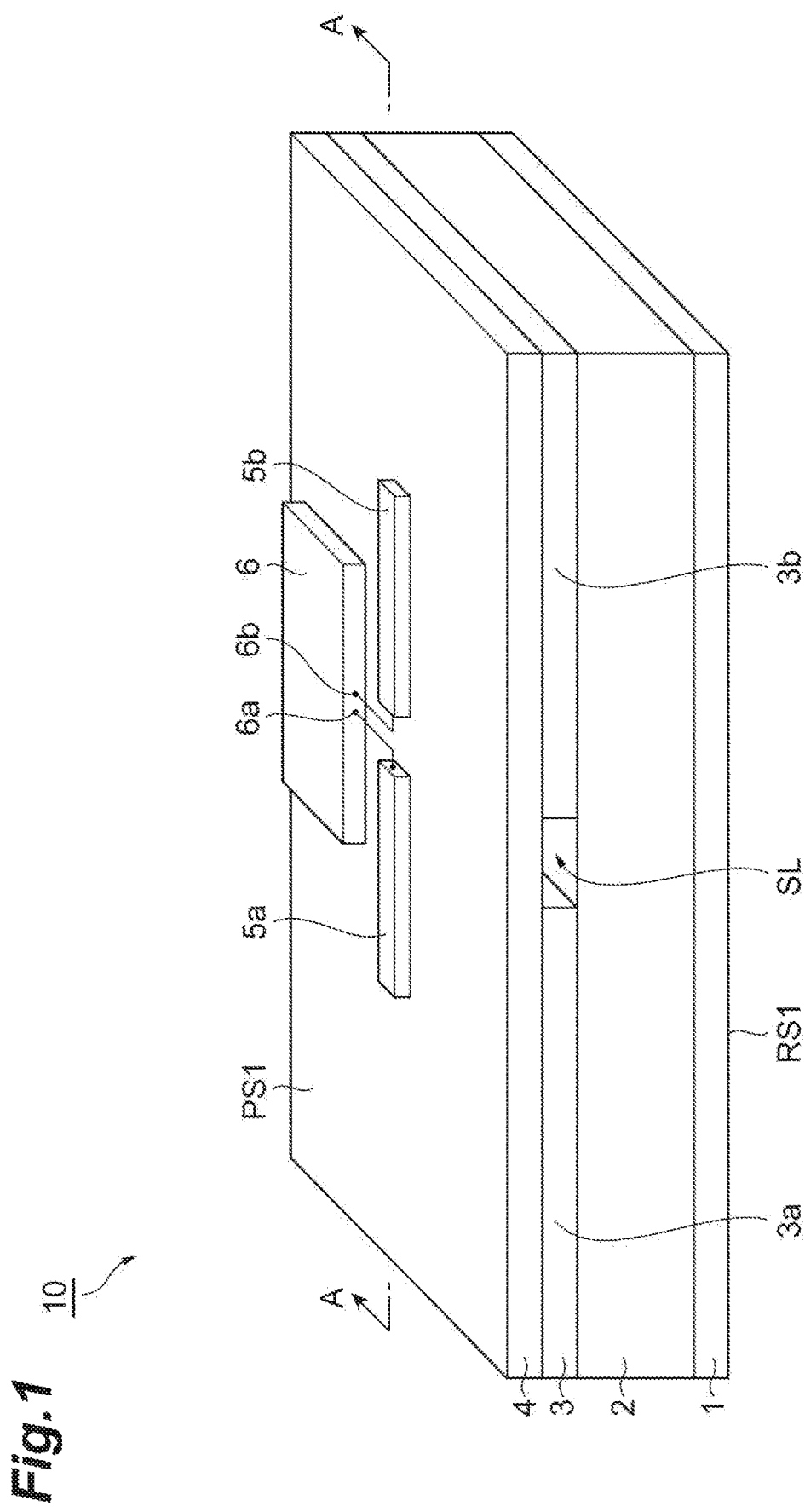
FIG. 1 is a diagram illustrating an appearance of an antenna device according to one exemplary embodiment.

In the following detailed description, reference is made to the accompanying drawings, which form a part hereof. The exemplary embodiments described in the detailed description, drawing, and claims are not meant to be limiting. Other exemplary embodiments may be utilized, and other changes may be made, without departing from the spirit or scope of the subject matter presented here.

When detecting a temperature of a wafer placed on an electrostatic chuck, the temperature is detected using a thermosensor provided on the wafer, and the detection result may be wirelessly transmitted to an external receiving device through an antenna provided on the wafer. The present disclosure provides a technique capable of suitably transmitting a detection result of a temperature of a wafer using an antenna provided on the wafer.

Hereinafter, various exemplary embodiments will be described. In one exemplary embodiment, an antenna device is provided. The antenna device includes: a first metal layer; a first dielectric layer disposed on the first metal layer, the first dielectric layer having a thermal conductivity and heat resistance that are higher than those of an FR-4 resin; a second metal layer disposed on the first dielectric layer, the second metal layer including a first segment and a second segment separated from each other; a second dielectric layer disposed on the second metal layer; a first metal terminal and a second metal terminal separately disposed on the second dielectric layer, the first metal terminal and the second metal terminal being disposed above the first segment and the second segment, respectively; and a thermosensor disposed on the second dielectric layer, the thermosensor having a pair of an input terminal and an output terminal electrically connected to the first metal terminal and the second metal terminal, respectively. Therefore, since the antenna device has relatively excellent thermal conductivity and heat resistance, the antenna device can operate satisfactorily even in a relatively high temperature environment. Further, even in a mode in which the antenna device is used by being placed above a metal member such as a metal plate, for example, it is possible to reduce the influence that the antenna device may receive from the metal member by disposing the antenna device with the first metal layer facing the metal member.

In one exemplary embodiment, the first dielectric layer includes aluminum nitride. Therefore, since the antenna device has aluminum nitride having relatively excellent thermal conductivity and heat resistance, the antenna device can operate satisfactorily even in a relatively high temperature environment. Further, even in a mode in which the antenna device is used by being placed above a metal member such as a metal plate, for example, it is possible to reduce the influence that the antenna device may receive from the metal member by disposing the antenna device with the first metal layer facing the metal member.

In one exemplary embodiment, the first dielectric layer includes: a first sublayer disposed on the first metal layer; a second sublayer disposed on the first sublayer; and a third sublayer disposed on the second sublayer. The first sublayer and the third sublayer each include a SiO$_2$-containing glass and the second sublayer includes silicon. Therefore, since the antenna device has a three-layer structure (SiO$_2$-containing glass/silicon/SiO$_2$-containing glass) having relatively excellent thermal conductivity and heat resistance, the antenna device can operate satisfactorily even in a relatively high temperature environment. Further, even in a mode in which the antenna device is used by being placed above a metal member such as a metal plate, for example, it is possible to reduce the influence that the antenna device may receive from the metal member by disposing the antenna device with the first metal layer facing the metal member.

In one exemplary embodiment, the first sublayer and the third sublayer each include quartz. As described above, quartz may be used as the SiO$_2$-containing glass which is the material of the first sublayer and the third sublayer.

In the antenna device according to one exemplary embodiment, the thermosensor includes a passive thermosensor operable by surface acoustic waves. As described above, since the thermosensor is a passive thermosensor, the antenna device can be used in any place in a closed space where power supply is difficult (for example, in a plasma processing apparatus).

In the antenna device according to one exemplary embodiment, the first metal terminal and the second metal terminal may be disposed on a central region or an edge region of the surface of the second dielectric layer.

In one exemplary embodiment, a temperature detection method is provided. The temperature detection method detects a temperature of a wafer provided with any of the above-described antenna devices. The temperature detection method includes: disposing the wafer on an electrostatic chuck; receiving a first signal from an external antenna at the thermosensor through the antenna device, the first signal oscillating the thermosensor to detect a temperature; outputting a second signal from the thermosensor in response to the first signal, the second signal indicating the temperature of the wafer detected by the thermosensor; and transmitting the second signal from the antenna device to the external antenna. Therefore, since the antenna device has relatively excellent thermal conductivity and heat resistance, the antenna device can operate satisfactorily even in a relatively high temperature environment, such as during plasma processing. Further, even in a mode in which the antenna device is used by being placed above a metal member (for example, an electrostatic chuck) such as a metal plate, for example, it is possible to reduce the influence that the antenna device may receive from the metal member by disposing the antenna device with the first metal layer facing the metal member. Therefore, by placing the antenna device on the wafer to be plasma processed by being placed on the electrostatic chuck, such as the plasma processing apparatus or the like, the antenna device can also be suitably used for detecting the temperature of the wafer being processed in a relatively high temperature environment.

In the temperature detection method according to one exemplary embodiment, the thermosensor includes a passive thermosensor operable by surface acoustic waves. As described above, since the thermosensor is a passive thermosensor, the antenna device can be used in any place in a closed space where power supply is difficult (for example, in a plasma processing apparatus).

According to the present disclosure, it is possible to provide a technique capable of suitably transmitting a detection result of a temperature of a wafer using an antenna provided on the wafer.

Hereinafter, various exemplary embodiments will be described in detail with reference to the drawings. In the drawings, the same or corresponding portions are denoted by the same reference numerals.

Figure 2:
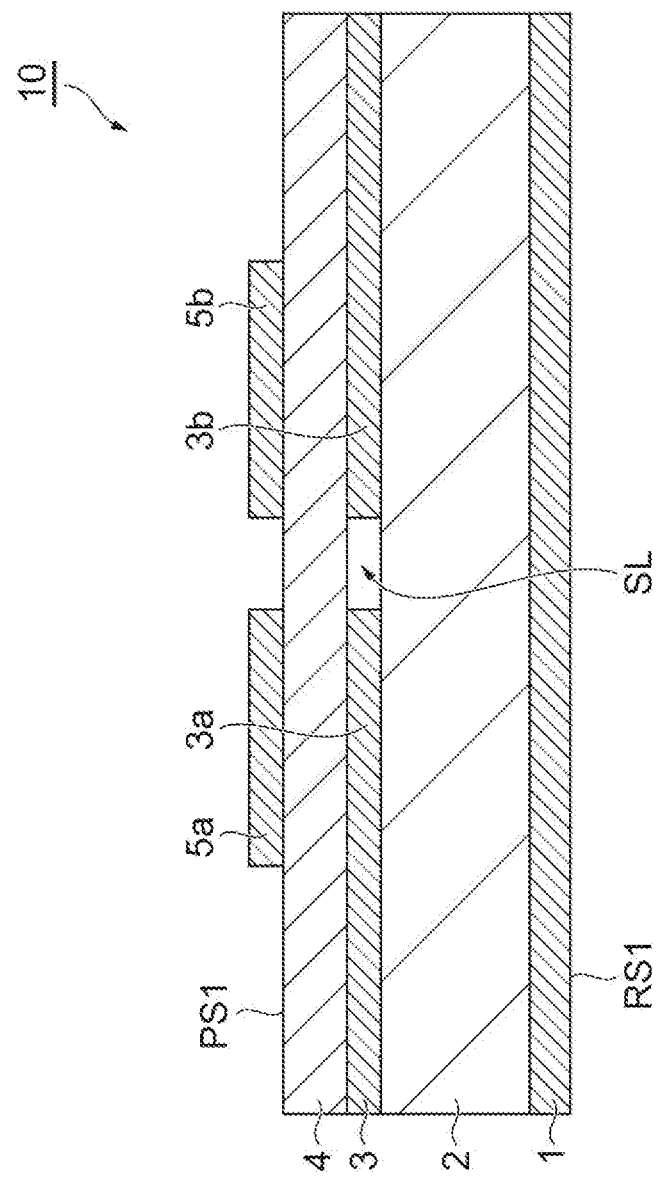
FIG. 2 is a diagram illustrating a configuration of a cross section of the antenna device illustrated in FIG. 1.

The configuration of an antenna device 10 according to one exemplary embodiment will be described with reference to FIGS. 1, 2, and 3. FIG. 2 illustrates a cross section of the antenna device 10 along the line A-A illustrated in FIG. 1. The antenna device 10 includes a first metal layer 1, a first dielectric layer 2, a second metal layer 3, a second dielectric layer 4, a pair of metal terminals (a first metal terminal 5a and a second metal terminal 5b), and a thermosensor 6. The first metal layer 1, the first dielectric layer 2, the second metal layer 3, and the second dielectric layer 4 are stacked in this order.

The first metal layer 1 has a back surface RS1 of the antenna device 10. The first dielectric layer 2 is provided on the first metal layer 1 and is in contact with the first metal layer 1. The second metal layer 3 is provided on the first dielectric layer 2 and is in contact with the first dielectric layer 2. The second dielectric layer 4 is provided on the second metal layer 3 and is in contact with the second metal layer 3. The second dielectric layer 4 has a main surface PS1 of the antenna device 10.

The first dielectric layer 2 may have thermal conductivity and heat resistance that are higher than those of a flame retardant type 4 (FR-4) resin. The first dielectric layer 2 may have thermal conductivity similar to that of silicon (Si). For example, the material of the first dielectric layer 2 may be aluminum nitride (AlN).

Figure 4:
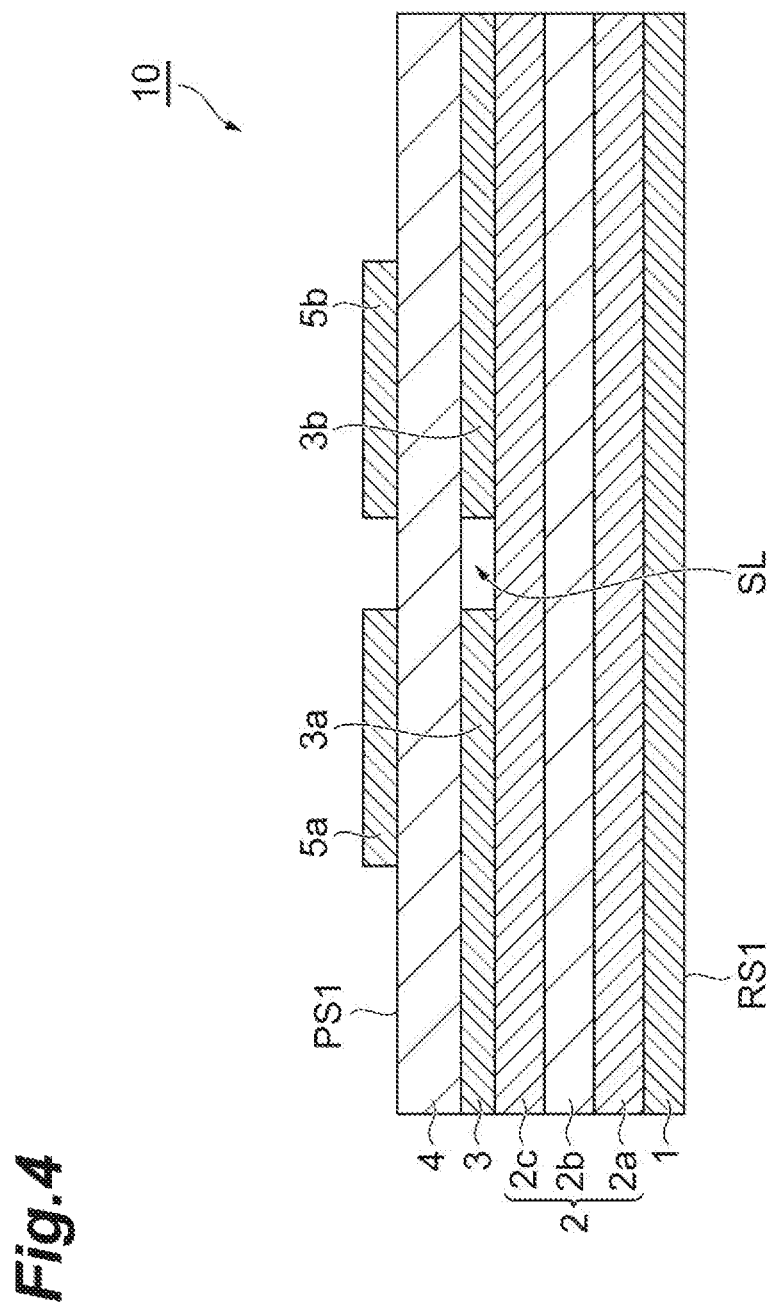
FIG. 4 is a diagram illustrating another configuration of the cross section of the antenna device illustrated in FIG. 1.

Further, the first dielectric layer 2 may have a three-layer structure illustrated in FIG. 4 instead of aluminum nitride. The first dielectric layer 2 illustrated in FIG. 4 includes a first sublayer 2a, a second sublayer 2b, and a third sublayer 2c. The third sublayer 2c is provided between the first sublayer 2a and the second sublayer 2b. The first sublayer 2a, the second sublayer 2b, and the third sublayer 2c are stacked in this order.

The first sublayer 2a is provided on the first metal layer 1 and is in contact with the first metal layer 1. The second sublayer 2b is provided on the first sublayer 2a and is in contact with the first sublayer 2a. The third sublayer 2c is provided on the second sublayer 2b and is in contact with the second sublayer 2b. The second metal layer 3 is provided on the third sublayer 2c and is in contact with the third sublayer 2c.

The material of the first sublayer 2a and the material of the third sublayer 2c are both SiO$_2$-containing glass, and may preferably be quartz. The material of the second sublayer 2b may be silicon (Si).

Regarding the dimensions of the antenna device 10, the main surface PS1 may have a rectangular shape of, for example, about 10 to 30 mm×30 to 60 mm. When the material of the first dielectric layer 2 is aluminum nitride, the thickness of the first dielectric layer 2 may be, for example, about 0.60 to 0.80 mm. When the first dielectric layer 2 has a three-layer structure as illustrated in FIG. 4, the thickness of each of the first sublayer 2a and the third sublayer 2c may be, for example, about 0.10 to 0.25 mm, and the thickness of the second sublayer 2b may be, for example, about 0.20 to 0.60 mm. The thickness of the second dielectric layer 4 may be, for example, 0.5 to 0.7 mm.

Returning to FIGS. 1 to 3, the description will be continued. The second metal layer 3 includes a first segment 3a and a second segment 3b disposed on the first dielectric layer 2. The first segment 3a and the second segment 3b are disposed between the first dielectric layer 2 and the second dielectric layer 4. The first segment 3a and the second segment 3b are disposed separately from each other. A gap between first segment 3a and the second segment 3b defines a slit SL.

The first metal terminal 5a and the second metal terminal 5b are provided on the second dielectric layer 4 (provided on the main surface PS1 of the second dielectric layer 4) and are in contact with the second dielectric layer 4. The first metal terminal 5a and the second metal terminal 5b are disposed separately from each other. A gap between the first metal terminal 5a and the second metal terminal 5b is defined above the slit SL. The first metal terminal 5a is disposed above the first segment 3a. The second metal terminal 5b is disposed above the second segment 3b.

Figure 3:
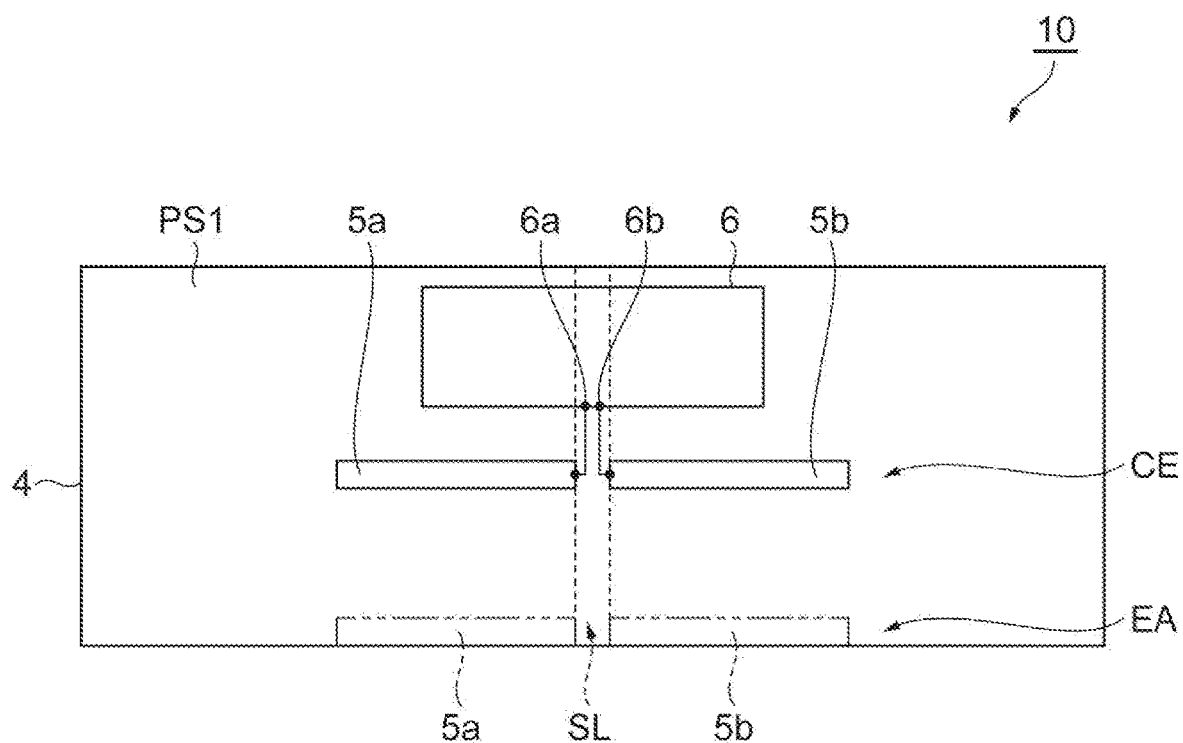
FIG. 3 is a diagram illustrating a configuration on a surface of the antenna device illustrated in FIG. 1.

As illustrated in FIG. 3, the first metal terminal 5a and the second metal terminal 5b may be disposed at a central region CA or an edge region EA of the main surface PS1 of the second dielectric layer 4.

The thermosensor 6 is provided on the second dielectric layer 4 (provided on the main surface PS1 of the second dielectric layer 4) and is in contact with the second dielectric layer 4. A pair of an input terminal and an output terminal (an input terminal 6a and an output terminal 6b) of the thermosensor 6 are electrically connected to the first metal terminal 5a and the second metal terminal 5b, respectively. The input terminal 6a and the first metal terminal 5a, and the output terminal 6b and the second metal terminal 5b may both be electrically connected by, for example, wire bonding.

The thermosensor 6 is a passive thermosensor using surface acoustic waves. The thermosensor 6 has no signal processing circuit.

More specifically, the thermosensor 6 may be a surface acoustic wave (SAW) sensor. The thermosensor 6 as the SAW sensor includes a piezoelectric substrate, and an interdigital transducer (IDT) and a reflector provided on the piezoelectric substrate (not illustrated). The interdigital transducer is electrically connected to the input terminal 6a and the output terminal 6b, and is disposed apart from a reflection circuit. The interdigital transducer and the reflector are disposed on the surface of the piezoelectric substrate such that the SAW propagates between the interdigital transducer and the reflection circuit. Since the thermosensor 6 of the SAW sensor does not require a battery, the thermosensor 6 is not limited to the operating temperature range of the battery, and the operating temperature range thereof may be relatively wide, for example, about −100 to 250° C.

Figure 5:
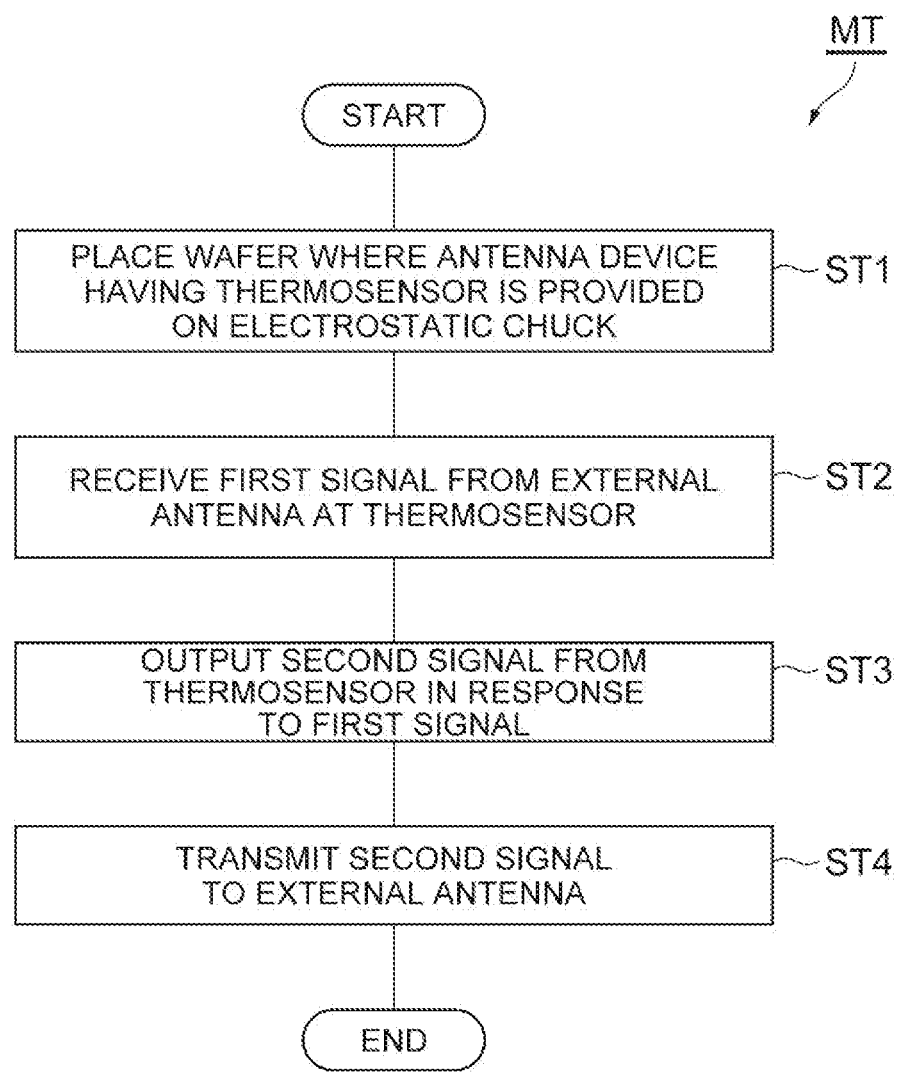
FIG. 5 is a flowchart illustrating a temperature detection method according to one exemplary embodiment.

Referring to FIG. 5, a temperature detection method by the antenna device 10 having the thermosensor 6 will be described. The flowchart illustrated in FIG. 5 illustrates a method MT according to one exemplary embodiment of the temperature detection method. The method MT may be, for example, a method of detecting a temperature of a wafer W disposed in a processing space such as a plasma processing apparatus.

Figure 6:
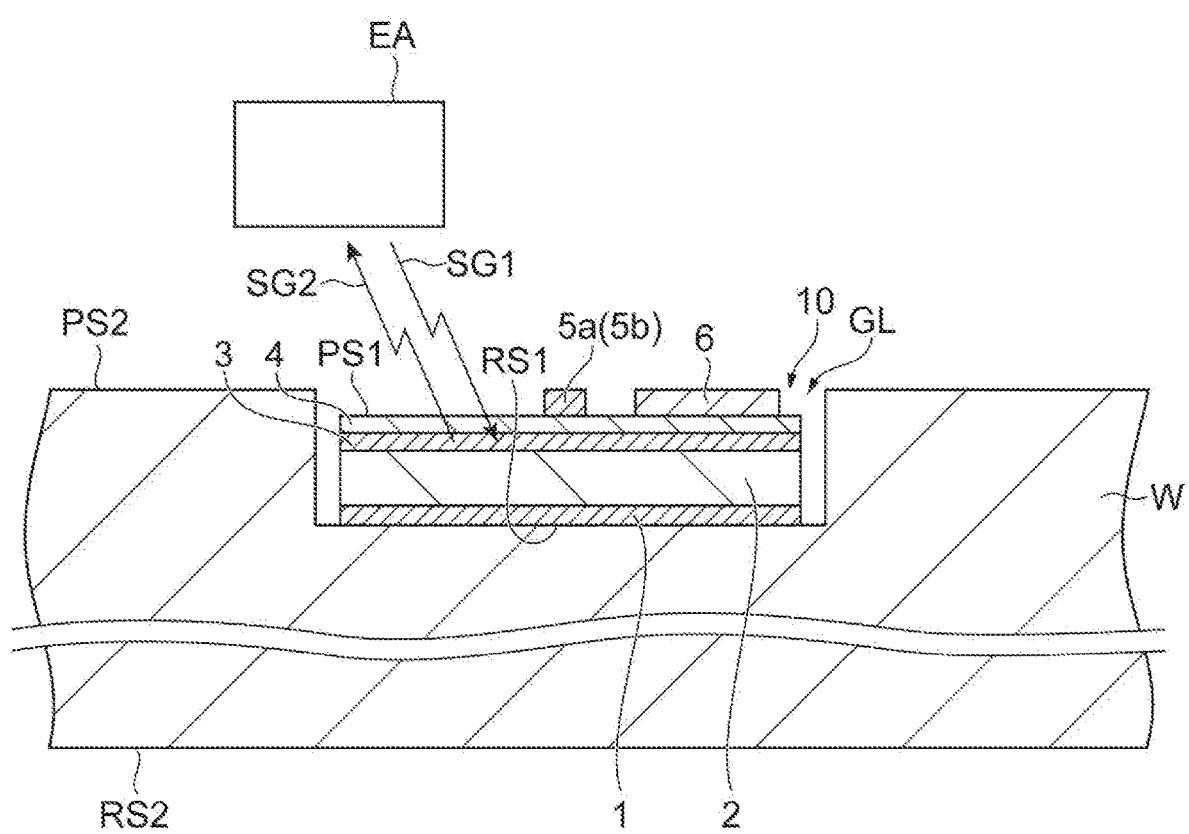
FIG. 6 is a diagram illustrating a cross section in a state where the antenna device illustrated in FIG. 1 is provided on a wafer.

First, in the method MT illustrated in FIG. 5, the wafer W (FIG. 6) is placed on an electrostatic chuck (ESC) in the processing space (step ST1). In this case, the antenna device 10 having the thermosensor 6 is provided on the wafer W. A back surface RS2 of the wafer W contacts the electrostatic chuck. The antenna device 10 having the thermosensor 6 is disposed in a recess GL provided on the main surface PS2 of the wafer W. The back surface RS1 of the antenna device 10 contacts the bottom surface of the recess GL. The thermosensor 6 transmits and receives signals to and from an external antenna OA which is connected to an external analysis device (computer) and which is disposed in advance around the electrostatic chuck.

In step ST2 subsequent to step ST1, the thermosensor 6 receives a first signal SG1 transmitted from the external antenna OA to the antenna device 10 through the second metal layer 3, the first metal terminal 5a, and the second metal terminal 5b (step ST2). The first signal SG1 is a signal for oscillating the thermosensor 6 to detect the temperature.

In step ST3 subsequent to step ST2, the thermosensor 6 outputs a second signal SG2 in response to the first signal SG1. The second signal SG2 is a signal indicating the temperature detected by the thermosensor 6. When the thermosensor 6 is a SAW sensor, the second signal SG2 may be generated by SAW generated on the piezoelectric substrate of the thermosensor 6 in response to the first signal SG1.

In step ST4 subsequent to step ST3, the antenna device 10 transmits the second signal SG2 to the external antenna OA.

The antenna device 10 having the configuration described above has the thermosensor 6 mounted thereon. The material of the first dielectric layer 2 of the antenna device 10 may be aluminum nitride. Alternatively, instead of aluminum nitride, the first dielectric layer 2 may have a three-layer structure in which the first sublayer 2a of a $SiO_2$-containing glass, the second sublayer 2b of silicon, and the third sublayer 2c of a $SiO_2$-containing glass are sequentially stacked on the first metal layer 1. As described above, the first dielectric layer 2 has thermal conductivity and heat resistance that are higher than those of the FR-4 resin, and in particular, may have thermal conductivity similar to that of silicon. Therefore, since the antenna device 10 has aluminum nitride or a three-layer structure ($SiO_2$-containing glass/silicon/$SiO_2$-containing glass) having excellent thermal conductivity and heat resistance than a tag antenna using the FR-4 resin. Therefore, the antenna device 10 can operate satisfactorily even in a relatively high temperature environment (such as during plasma processing). Further, since the thermosensor 6 is a passive thermosensor, the antenna device 10 can be used in any place in a closed space where power supply is difficult (for example, in a plasma processing apparatus).

Figure 7:
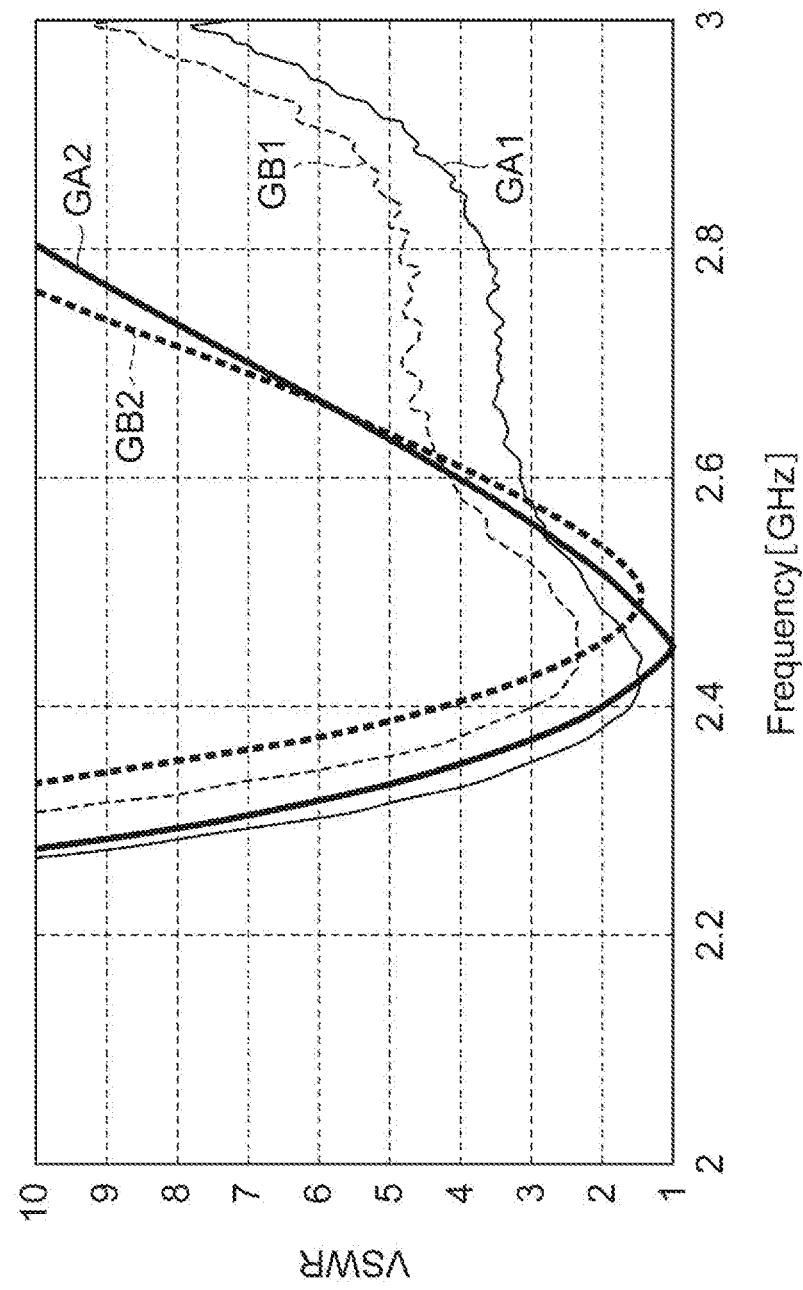
FIG. 7 is a diagram for describing an effect of the antenna device illustrated in FIG. 1.

Further, even in a mode in which the antenna device 10 is used by being placed above a metal member (for example, an electrostatic chuck) such as a metal plate, for example, it is possible to reduce the influence that the antenna device 10 may receive from the metal member by disposing the antenna device 10 with the first metal layer 1 facing the metal member. FIG. 7 illustrates the influence of the presence or absence of the metal member. In FIG. 7, the horizontal axis represents frequency, and the vertical axis represents voltage standing wave ratio (VSWR). A line GA1 represents an actual measurement result of the VSWR of the antenna device 10 obtained in a mode where no metal member is provided. A line GB1 represents an actual measurement result of the VSWR of the antenna device 10 obtained in a mode in which the metal member is provided. A line GA2 represents a simulation result of the VSWR of the antenna device 10 obtained in a mode where no metal member is provided. A line GB2 represents a simulation result of the VSWR of the antenna device 10 obtained in a mode where the metal member is provided. Referring to FIG. 7, it can be seen that the influence that the VSWR of the antenna device 10 may receive from the metal member is relatively low by any of the actual measurement and the simulation.

The antenna device 10 can have at least the effects described above. Therefore, for example, by placing the antenna device 10 on the wafer to be plasma processed by being placed on the electrostatic chuck of the plasma processing apparatus or the like, the antenna device 10 can also be suitably used for detecting the temperature of the wafer being processed in a relatively high temperature environment.

Although various exemplary embodiments have been described above, various modified aspect may be configured without being limited to the above-described exemplary embodiments.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An antenna device comprising:
   a first metal layer;
   a first dielectric layer disposed on the first metal layer, the first dielectric layer having a thermal conductivity and heat resistance that are higher than those of an FR-4 resin;
   a second metal layer disposed on the first dielectric layer, the second metal layer including a first segment and a second segment separated from each other;
   a second dielectric layer disposed on the second metal layer;
   a first metal terminal and a second metal terminal separately disposed on the second dielectric layer, the first metal terminal and the second metal terminal being disposed above the first segment and the second segment, respectively; and
   a thermosensor disposed on the second dielectric layer, the thermosensor having a pair of an input terminal and an output terminal electrically connected to the first and second metal terminals respectively.

2. The antenna device according to claim 1, wherein the first dielectric layer comprises aluminum nitride.

3. The antenna device according to claim 1, wherein the first dielectric layer comprises:
   a first sublayer disposed on the first metal layer;
   a second sublayer disposed on the first sublayer; and
   a third sublayer disposed on the second sublayer; wherein the first sublayer and the third sublayer each comprise a $SiO_2$-containing glass and the second sublayer comprises silicon.

4. The antenna device according to claim 3, wherein the first sublayer and the third sublayer each comprise quartz.

5. The antenna device according to claim 1, wherein the thermosensor comprises a passive thermosensor operable by surface acoustic waves.

6. The antenna device according to claim 4, wherein the thermosensor comprises a passive thermosensor operable by surface acoustic waves.

7. The antenna device according to claim 1, wherein the first metal terminal and the second metal terminal are disposed on a central region of the second dielectric layer.

8. The antenna device according to claim 4, wherein the first metal terminal and the second metal terminal are disposed on a central region of the second dielectric layer.

9. The antenna device according to claim 1, wherein the first metal terminal and the second metal terminal are disposed on an edge region of the second dielectric layer.

10. The antenna device according to claim 4, wherein the first metal terminal and the second metal terminal are disposed on an edge region of the second dielectric layer.

11. A method of detecting a temperature of a wafer provided with the antenna device according to claim 1, the method comprising:
    disposing the wafer on an electrostatic chuck;
    receiving a first signal from an external antenna at the thermosensor through the antenna device, the first signal oscillating the thermosensor to detect a temperature;
    outputting a second signal from the thermosensor in response to the first signal, the second signal indicating the temperature of the wafer detected by the thermosensor; and
    transmitting the second signal from the antenna device to the external antenna.

12. The method according to claim 11, wherein the thermosensor comprises a passive thermosensor operable by surface acoustic waves.

* * * * *